US010719596B1

(12) United States Patent
Goodsitt et al.

(10) Patent No.: US 10,719,596 B1
(45) Date of Patent: Jul. 21, 2020

(54) SYSTEM, METHOD, AND COMPUTER-ACCESSIBLE MEDIUM FOR AUTHENTICATION VIA HANDWRITING STYLE

(71) Applicant: Capital One Services, LLC, McLean, VA (US)

(72) Inventors: Jeremy Goodsitt, Champaign, IL (US); Kate Key, Effingham, IL (US); Mark Watson, Sedona, AZ (US); Anh Truong, Champaign, IL (US); Vincent Pham, Champaign, IL (US); Fardin Abdi Taghi Abad, Champaign, IL (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/517,821

(22) Filed: Jul. 22, 2019

(51) Int. Cl.
*G06F 21/32* (2013.01)
*G06N 3/08* (2006.01)
(Continued)

(52) U.S. Cl.
CPC ......... *G06F 21/32* (2013.01); *G06K 9/00429* (2013.01); *G06N 3/088* (2013.01); *G06K 2209/27* (2013.01); *G06N 3/0454* (2013.01)

(58) Field of Classification Search
CPC ...... G06F 21/32; G06N 3/088; G06N 3/0454; G06K 9/00429; G06K 2209/27
(Continued)

(56) References Cited

U.S. PATENT DOCUMENTS

| 5,303,312 A | 4/1994 | Comerford et al. |
| 5,666,438 A | 9/1997 | Beernink et al. |

(Continued)

OTHER PUBLICATIONS

Bulacu, M. et al.; "Writer Identification Using Edge-Based Directional Features", IEEE Computer Society, Proceedings of the Seventh International Conference on Document Analysis and Recognition (ICDAR 2003).
(Continued)

*Primary Examiner* — Aravind K Moorthy
(74) *Attorney, Agent, or Firm* — Hunton Andrews Kurth LLP

(57) ABSTRACT

Methods, systems, and computer-accessible mediums are described to authenticate a user using a user's handwriting style rather than using the user's signature through adaptive handwriting challenges which are verified using the machine learning technique of a generative adversarial network. An exemplary system, method, and computer-accessible medium can include, for example, receiving at a first entity, a request for authentication of a user associated with a user identifier; sending from the first entity to the user, a first adaptive phrase; receiving at the first entity, a digital representation of a human transcription of the first adaptive phrase; performing an artificial-intelligence based comparison between the received digital representation of the human transcription of the first adaptive phrase and a user-specific computer-generated discriminator or user-specific computer-generated model of the first adaptive phrase; generating a first score based on the comparison; sending from the first entity (i) an authentication message if the first score is equal to or above a pre-determined threshold or (ii) a failure message if the first score is below a pre-determined threshold.

20 Claims, 7 Drawing Sheets

(51) Int. Cl.
*G06K 9/00* (2006.01)
*G06N 3/04* (2006.01)

(58) Field of Classification Search
USPC .......................................................... 726/18
See application file for complete search history.

(56) References Cited

U.S. PATENT DOCUMENTS

| | | | |
|---|---|---|---|
| 6,456,740 B1 | 9/2002 | Carini et al. | |
| 2007/0005537 A1* | 1/2007 | Abdulkader | G06K 9/00429 706/20 |
| 2008/0107340 A1* | 5/2008 | Kwok | G06K 9/00852 382/186 |
| 2009/0253107 A1* | 10/2009 | Marggraff | G09B 11/00 434/162 |
| 2010/0332227 A1* | 12/2010 | Melamed | G06F 17/2881 704/236 |
| 2011/0320352 A1* | 12/2011 | Mehew | G06K 9/00885 705/44 |
| 2014/0222419 A1* | 8/2014 | Romano | G06F 16/367 704/10 |
| 2014/0297528 A1* | 10/2014 | Agrawal | G06Q 20/40145 705/44 |
| 2015/0279365 A1* | 10/2015 | Sharifi | G10L 15/26 704/235 |
| 2016/0004422 A1* | 1/2016 | Cohen | G06F 3/04883 382/119 |
| 2016/0253992 A1* | 9/2016 | Raux | G06K 9/00402 704/240 |
| 2017/0330559 A1* | 11/2017 | Korn | G06F 17/274 |
| 2018/0188948 A1* | 7/2018 | Ouyang | G06F 3/04883 |
| 2018/0268728 A1* | 9/2018 | Burdis | G09B 7/04 |
| 2018/0338065 A1* | 11/2018 | Zyskind | G06K 9/222 |
| 2018/0349692 A1* | 12/2018 | Dixon | G06K 9/00422 |
| 2019/0057472 A1* | 2/2019 | Ross | G06Q 50/2053 |
| 2019/0266912 A1* | 8/2019 | Barzman | G09B 7/00 |
| 2019/0341052 A1* | 11/2019 | Allibhai | G06N 3/02 |
| 2019/0347399 A1* | 11/2019 | Cramer | G06F 21/46 |
| 2020/0043475 A1* | 2/2020 | Nguyen | G06K 9/6227 |
| 2020/0043496 A1* | 2/2020 | Abdulkader | G10L 15/265 |

OTHER PUBLICATIONS

Ballard, L. et al.; "Evaluating the Security of Handwriting Biometrics", Johns Hopkins University, Lehigh University.

\* cited by examiner

System 200

SYSTEM, METHOD, AND COMPUTER-ACCESSIBLE MEDIUM FOR AUTHENTICATION VIA HANDWRITING STYLE

FIELD OF THE DISCLOSURE

The present disclosure relates generally to the use of a handwriting style for authentication, and more specifically, to an exemplary system, method, and computer-accessible medium to dynamically authenticate a user through the use of a handwriting style as opposed to a fixed signature.

BACKGROUND INFORMATION

A typical method of authentication uses a user's signature, often thought to be unique to the user, and irreproducible by anyone other than the user. This signature is often created at the time of creation of an account that is associated with the user. Banks often require a physical signature to be filed at the time of creation of an account and use this signature for verification of the user in negotiating financial instruments. These signatures are often stored on signature cards at the bank and are compared manually by bank employees when attempting to authenticate a user. Other entities, such as credit card processors, require a signature to authenticate a transaction.

Although prevalent, the use of traditional signatures for authentication comes with several drawbacks. For instance, an individual determined to fake a signature can do so through the use of a professional artist. Signatures are also static in that they use a fixed and limited set of characters and character sequences. This only increases the likelihood that they can be forged by an artist. Furthermore, the verification of a signature usually requires a professional to compare a sample deemed authentic with the sample that is desired to be verified. This process is usually time consuming—thereby not allowing a signature to be used for real-time or dynamic authentication of a user. The process can also be costly due to the use of experts and thus not economically feasible. In addition, a degree of subjectivity would be present, thus often allowing for false positives and false negatives to be created during the process. Even experts only look for certain fixed characteristics associated with handwriting, such as the slant, curvature, or shape of loops. Experts cannot dynamically generate new sets of characteristics for more detailed analysis.

Additionally, a user can have slightly different signature at different times, as a human signature is never exactly reproducible. Thus, an exact comparison of even a pre-recorded electronic signature with a signature to be tested would not efficiently solve the problem of verifying a user by his or her signature.

A further drawback of this system is the inability of individuals untrained in writing of other scripts to perform even a cursory review of a signature when the signature is written in another script. Additionally, user data typically associated with a user can be easily accessible by a user through the use of his or her intrinsic handwriting style, obviating the need for a user to remember user identifiers and associated passwords and instead providing access through the use of the methods described herein.

Thus, it can be beneficial to provide an exemplary system, method, and computer-accessible medium for dynamic authentication of a user through the use of a handwriting style as opposed to a fixed signature as described herein.

SUMMARY OF EXEMPLARY EMBODIMENTS

Embodiments of the present disclosure provide a system, method, and computer-accessible medium, which can include, for example, (i) receiving at a first entity a request for authentication of a user associated with a user identifier, (ii) sending from the first entity to the user, a first adaptive phrase, (iii) receiving at the first entity, a digital representation of a human transcription of the first adaptive phrase; (iv) performing an artificial-intelligence based comparison between the received digital representation of the human transcription of the first adaptive phrase and a user-specific computer generated discriminator or user-specific computer generated model of the first adaptive phrase, (v) generating a first score based on the comparison, and (vi) sending from the first entity (a) an authentication message if the first score is equal to or above a pre-determined threshold or (b) a failure message if the first score is below a pre-determined threshold.

Example embodiments can further include (1) sending a second adaptive phrase if the first score is below a pre-determined threshold, receiving at the first entity a digital representation of a human transcription of the second adaptive phrase, performing a second comparison between the received digital representation of the human transcription of the second adaptive phrase to a user-specific computer generated discriminator or user-specific computer generated model of the second adaptive phrase, generating a second score based on the second comparison, and sending from the first entity (i) an authentication message if the second score is equal to or above a pre-determined threshold or (ii) a failure message if the second score is below a pre-determined threshold. Further embodiments can further include (1) setting the number of alphanumeric characters in the adaptive phrase is based on the user identifier associated with the user; (2) setting the pre-determined threshold is based on the user identifier; (3) modifying the pre-determined threshold based on a prior failure message; (4) associating additional metadata with the request for authentication; (5) associating additional metadata with the request for authentication wherein the metadata includes at least one of (i) input device, (ii) purpose of authentication (iii) a request for additional information associated with the user stored at the first entity, or (iv) language or script preference; (6) receiving at the first entity a first pressure map associated with the first adaptive phrase; (7) receiving at the first entity a first pressure map associated with the first adaptive phrase further comprising (i) performing a second comparison between the first pressure map and a user-specific computer generated discriminator or user-specific computer generated model of the first pressure map associated with the first adaptive phrase and generating a pressure-match score based on the comparison (ii) modifying the first score by the second score and (iii) sending from the first entity (a) an authentication message if the first score and the second score are both equal to or above a pre-determined threshold or (b) a failure message if the first score is below a pre-determined threshold; (8) including additional information associated with the user stored at the first entity is attached to the authentication message; (9) performing the comparison between the digital representation of a human transcription of the first adaptive phrase computer generated model of the first adaptive phrase and a user-specific computer generated discriminator or user-specific computer generated model of the first adaptive phrase based on a discriminator trained using a generative adversarial network. Other example embodiments can further include configuring the request for an authentication of a user associated with a user identifier to further include metadata associated with the input device for the digital representation of a human transcription of the first adaptive phrase; and wherein the comparison between the first pressure map and a user-specific computer generated discriminator or user-specific computer generated model of the first pressure map associated with the first adaptive phrase is modified based on the metadata associated with the input device.

In some exemplary embodiments of the present disclosure, the exemplary system, method and computer-accessible medium can include (1) receiving at a first entity, a set of information, generated by a first user, consisting of at least user transcribed phrases; (2) training at the first entity, a user-specific discriminator using a generative adversarial network; (3) receiving at the first entity a request for authentication of the first user associated with a user identifier; (4) sending from the first entity to the first user, a first adaptive phrase; (5) receiving at the first entity, a digital representation of a human transcription of the first adaptive phrase; (6) evaluating the authenticity of the received digital representation of the human transcription of the first adaptive phrase using the user-specific computer generated discriminator; (7) sending from the first entity (i) an authentication message if the user-specific computer generated discriminator authenticates the received digital representation of a human transcription or (ii) a failure message otherwise. Example embodiments can further include (1) the set of information further containing at least pressure values associated with the user transcribed phrases; (2) the set of information further containing (i) containing at least pressure values associated with the user transcribed phrases and (ii) at least metadata about an input device for the user transcribed phrases; (3) the set of information further containing (i) containing at least pressure values associated with the user transcribed phrases and (ii) at least metadata about an input device for the user transcribed phrases wherein the discriminator is trained based on the metadata about the input device; (4) the set of information further containing at least pressure values associated with the user transcribed phrases wherein the computer hardware arrangement is further configured to attempt to match the received digital representation of the human transcription of the first adaptive phrase to a second user through comparison with a data-base of user-specific computer generated discriminators or user-specific computer generated models.

Embodiments of the present disclosure provide a system, method, and computer-accessible medium, which can include, for example receiving at a first entity, a request for authentication of a user associated with a user identifier; receiving at a first entity additional metadata associated with the request for authentication including at least one of (i) language preference, (ii) purpose of request, and (iii) input device; sending from the first entity to the user a first adaptive phrase; receiving at the first entity a user generated digital representation of a human transcription of the first adaptive phrase; evaluating the authenticity of the user generated digital representation of a human transcription of the first adaptive phrase by comparison with a user-specific computer generated discriminator trained with at least the received first entity additional metadata; sending from the first entity (i) an authentication message if the comparison succeeds or (ii) a failure message if the first score is below a pre-determined threshold.

Embodiments of the present disclosure provide a system, method, and computer-accessible medium, which can include, for example (1) receiving at the computer-accessible medium, a request for authentication of a user associated with a user identifier; (2) receiving at the computer-accessible medium metadata associated with the request for authentication including at least one of (i) language preference, (ii) purpose of request, or (iii) input device; (3) sending from the computer-accessible medium to the user a first adaptive phrase; (4) receiving at the computer-accessible medium a user generated digital representation of a human transcription of the first adaptive phrase; (5) evaluating the authenticity of the user generated digital representation of a human transcription of the first adaptive phrase by comparison with a user-specific computer-generated discriminator trained with at least the received first entity additional metadata; (6) sending from the computer-accessible medium (i) an authentication message if the comparison succeeds or (ii) a failure message if the first score is below a pre-determined threshold; and (7) when a failure message is sent from the computer-accessible medium, iterating the instructions.

DETAILED DESCRIPTION OF EXEMPLARY EMBODIMENTS

An exemplary system, method, and computer-accessible medium can be provided to allow for the dynamic authentication of a user through the use of a handwriting style as opposed to a fixed signature. For example, a first entity can store records relating to the handwriting style of a user and perform comparisons on a received sample of handwriting with other stored samples to authenticate a user. This information can be used to verify a user's identity. For example, the first entity can receive a request for an authentication associated with a user identifier. The first entity can then send to a user, or another end-user device, a first adaptive phrase for the user to transcribe in a digital form. The user can transcribe this using any suitable method or device, such as for example a signature tablet pad. This digital transcription of the first adaptive phrase can be sent to the first entity. The first entity can then compare the received digital transcription with a model generated at the first entity. The first entity can further generate a score based on the comparison between the received digital transcription and a user-specific computer-generated transcription of the first adaptive phrase. Details of the computer-generated transcription of the first adaptive phrase are described below. The generation of the model with which the received digital transcription is compared can occur through a variety of methods, including models generated through computer generated discriminators or user-specific generated models using a generative adversarial network, as further explained below. Based on the score generated, the first entity can send an authentication message if the score is above a pre-determined threshold. Similarly, the first entity can send a failure message if the score is below a pre-determined threshold.

If a failure message is sent by the first entity, a second adaptive phrase can be sent from the first entity to the user or a user input device in a second attempt to authenticate the user. Adaptions can be made to the second adaptive phrase in order to make it more complex or provide a higher level of security when compared to the first adaptive phrase, including for example, a longer alphanumeric string of characters for the user to transcribe or the inclusion of additional metadata. The first entity can receive a human transcription of the second adaptive phrase. Additionally, the generation of an additional score can occur based on a second comparison between the received human transcription of the second adaptive phrase and a computer-generated transcription of the phrase. Based on the comparison, an additional message can be sent to the user or user device. As part of the comparison, information additional to the transcription of the phrase itself can be considered, such as a map of pressure associated with or generated during the transcription by the user.

Figure 1:
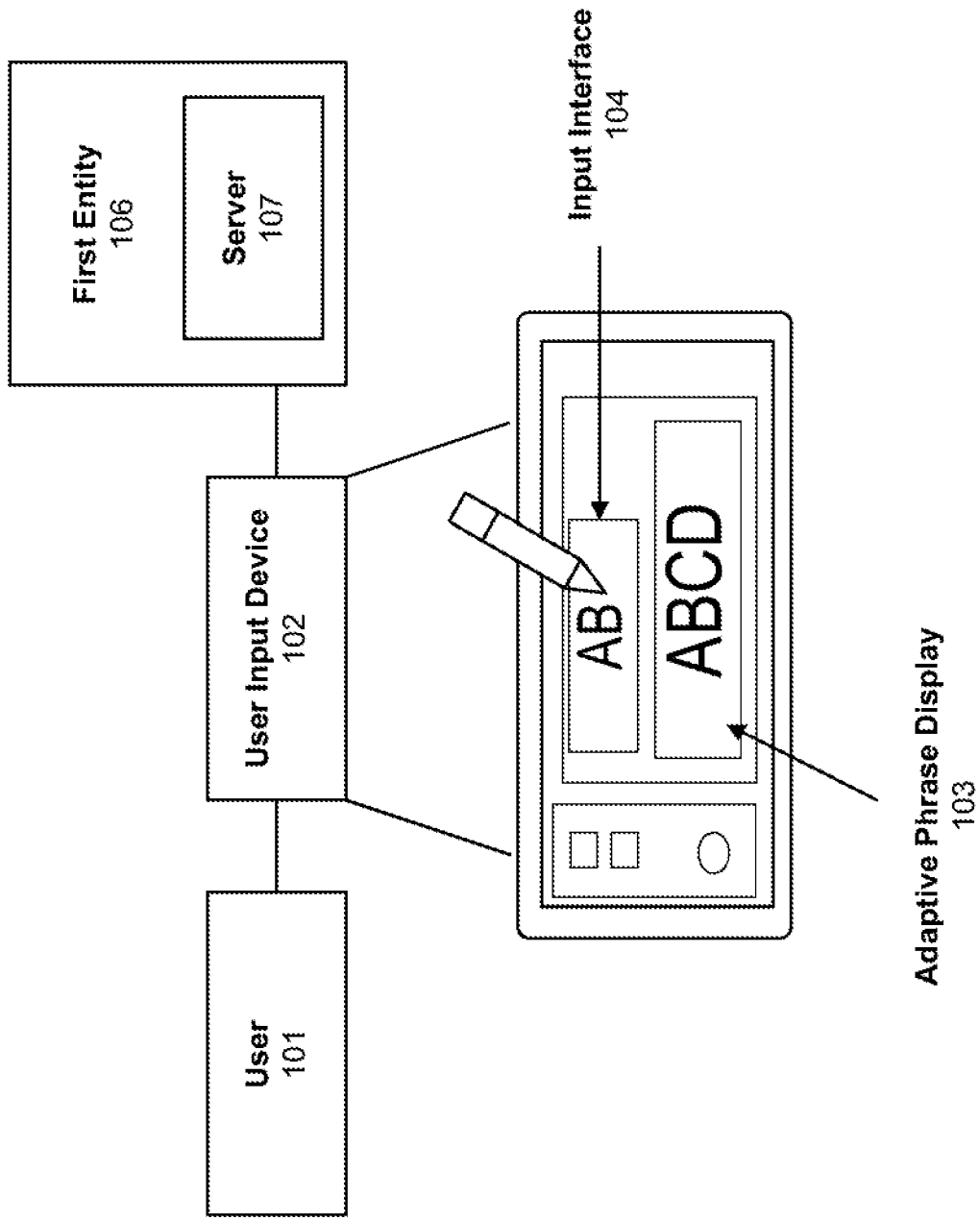
FIG. 1 is illustrates a process of authentication of a request for authentication of a user associated with a user identifier according to an example embodiment.

FIG. 1 is a schematic diagram illustrating the exemplary system, method, and computer-accessible medium, which facilitates a process of authentication of a request for authentication of a user associated with a user identifier.

FIG. 1 illustrates the interactions of a user, 101, a user input device 102, an adaptive phrase display 103, an input interface 104, a network 105, a first entity 106, and a server 107. The user 101 can physically be in a commercial establishment, where his or her identity is required to be verified in order to, for instance, complete a transaction. Associated with the user can be a user identifier. For example, a user identifier may be associated with a user's credit card. A user identifier can be any suitable identifier to uniquely identify a user or a group of users. For instance, a user-name, email address, phone number, driver's license numbers, passport number, employee identification ID, and credit card numbers can all be user identifiers. Any unique string of numbers and characters can be a suitable user identifier.

The user 101 can be physically proximate to a user input device, 102. Device 102 can be an input device which is capable of allowing a user to transcribe any alphanumeric phrase. Examples of user input device 102 include a mobile phone, a smartphone, a tablet, a digital writing or digital graphics tablet. However, the user input device 102 can be from any class of devices with the capability of sending and receiving messages and allowing a user to draw a transcription of an alphanumeric phrase. The user input device 102 can thus for example also be a laptop or a personal computer. The user input device 102 can be, or can include, custom designed hardware capable of receiving and sending a message. The user input device 102 can further include custom designed software capable of performing the functionality described below. The user input device 102 can further include an adaptive phrase display, 103, which allows the user input device to display an alphanumeric phrase or string intended for the user to transcribe. The user input device 102 can also further include an input interface 104 which can allow the user to input his or her transcription of an alphanumeric phrase. The adaptive phrase display 103 and input interface 104 need not be physically within the same structure as the user input device 102. For instance, another screen physically separate from the user input device 102 can act as the adaptive phrase display 103. Thus, in an example embodiment, the user's own smartphone can act as an adaptive phrase display 103.

The user input device 102 can further optionally include a dedicated device to ease the user 101 in transcription of a phrase. For example, the user input device can be compatible with or include a stylus, smartpen, or a digital pen. The user input device can also be a digital smart pen, which can digitally record a user's transcription of an alphanumeric phrase without a visible representation of the user's transcription immediately being created. The user input device 102 can also be a device which immediately creates a digital representation of an analog piece of writing. Thus, the user input device 102 can be for example, a Wacom inkling Digital Sketch Pen, Livescribe 3, Pulse Smartpen, Echo Smartpen, Equil Jot, Mobile Notes Pro Digital Pen, or any similar device. The user input device 102 can also have additional hardware and software characteristics associated with it. For example, the user input device can have associated with it characteristics such as the resolution of the captured phrase transcription, ability to capture pressure input, sensitivity gradient in input and pressure. This metadata can also be included as part of communications with a first entity 106, as described below.

The user input device 102 can also be capable of receiving a user identifier from the user 101. The user identifier can be transferred through any suitable method by the user to the user input device 102 including but not limited to Bluetooth, Wi-Fi, Near-Field Communication, Li-Fi, Infrared, and RFID. The user 101 may also have his or her user identifier stored or encoded on a physical medium, such as a credit card. In an exemplary embodiment, the user input device 102 will be capable of receiving the user input.

The user input device 102 can be in communication with a first entity 106 through a network 105. Network 105 can be any means, mechanism, protocol, or pathway to allow information to be transferred between the first entity 106, the second entity 104, and/or user 101, including but not limited to Wi-Fi, WLAN, RF, radio, IR, Bluetooth, cellular, near-field communication, SMS, MMS, any combination thereof, or any other suitable architecture or system that facilitates the communication of signals, data, and/or messages. The first entity 106 and the user input device 102 can be in communication through a single network or a multitude of networks.

It is also possible that user input device 102 contain the first entity 106 by being capable of the functionality and capability of the first entity 106 described below.

The first entity 106 can be any entity that can communicate with the user input device 102 through any suitable method of communication, which can include, for example, receiving and sending a message from the user input device 102 as well as sending and receiving messages with a second entity 104. The first entity 106 can include a computing apparatus used to store data and communicate with device 102. The first entity 106 can include a database of user identifiers, along with user information associated with the user identifier, which can be stored on a server 107. The first entity 106 can include a single server 107 or multiple servers, computing arrangements, or storage devices. Examples of the first entity can be a commercial company performing verification services, a credit bureau, a government entity, a payment processor, a social media company, or a data storage company.

The user 101 can, through any other medium, create an account or profile with the first entity 106, which can be associated with a unique user identifier. The creation of the account can also be done on behalf of the first user 101. For example, a credit card company or financial institution can be the first entity 106, which creates the said account. As another example, a credit card company or financial institution can create with the first entity 106 a unique user identifier associated with a user 101. The user identifier can be any alpha-numeric string unique to the user 101. The user identifier can further append information unique to the user 101, such as a fingerprint or genetic information. The addition of this information can be used advantageously to verify his/her ownership of the user data if a password or other access key is lost or forgotten. In such a case, a truncated version of the user identifier can be used for the functions described below, while the fingerprint or other unique information be used to verify the identity of the user 101. The account or profile at the first entity 106 can store the information that the user can share with another entity. This information can be stored on, for example, a server 107. The server 107 can include one or more databases to store user information associated with a user identifier. This information can include, but is not limited to, email address, physical address, first name, last name, social security number, blood type, hair color, weight, age, date of birth, work address, membership identifiers, shopping preferences, etc. Other, non-textual information, associated with the user 101 can also be included on the server 107, such as, an image of a government-issued ID, fingerprint data, a voiceprint, etc.

Sever 107 can further store a database of user-specific computer-generated discriminators or computer-generated models of an adaptive phrase, as described in more detail below. User data can be stored at the first entity 106 or server 107 in any suitable format. The user data at the first entity 106 or server 107 can be encrypted and stored in a secure format to prevent unauthorized access. Methods of encryption and minimum key length that can be used include: Key exchange: Diffie-Hellman key exchange with minimum 2048 bits; Message Integrity: HMAC-SHA2; Message Hash: SHA2 256 bits; Asymmetric encryption: RSA 2048 bits Symmetric-key algorithm: AES 128 bits; Password Hashing: Argon2, PBKDF2, Scrypt, Bcrypt. However, any suitable encryption algorithm/procedure can be used which allows the data to be secured at the first entity 106.

First entity 106 can also store user information that is associated with more than one user (e.g., one or more connected users). This can be performed in the context of shared, joint, or connected accounts between more than one user. This can be, for example, a family account (e.g., financial accounts, loyalty accounts, etc.), where multiple users from the same family can share one account with an online retailer, or can have multiple separate accounts that are linked to one another, and all accounts can have different sets of user information. For example, the connected accounts can be an account shared between spouses. The set of user information at the first entity 106 associated with the account can be associated with more than one user.

As an example, a user 101 may decide to go shopping at a retail store. The user 101 can decide to pay with a credit card. As another example, the user may decide to pay with another commercial service, such as PayPal or Zelle. The user may also decide that he needs to lookup additional information associated with the retail store, such as his loyalty points or customer ID. When the user 101 begins the process of paying with, for example, his or her credit card, the credit card issuer may desire to verify the identity of user 101. The credit card issuer, either acting as the first entity 106, or an intermediary between the first entity 106 and the user 101, can send to a request for authentication of the user. The request can include for example, a user identifier identifying user 101. The user identifier can be the user's credit card number. The first entity in response to the request for authentication can send to a user input device 102 an adaptive phrase. The adaptive phrase can generally be an alphanumeric string, which can consist of commonly known words. The adaptive phrase can also consist of unknown, nonsense, or synthetic words generated at the first entity. The length or complexity of the adaptive phrase can also be modified or set based on the user identifier. The request for authentication can contain additional metadata, such as (i) information about the input device, (ii) purpose of authentication (iii) a request for additional information associated with the user stored at the first entity, or (iv) language or script preference.

After receiving the request for authentication, the adaptive phrase can be sent via the network 105 to the user input device 102. The adaptive phrase can then be displayed on the adaptive phrase display 103. Also, the adaptive phrase can also be sent to any user device associated with the user identifier. For instance, the adaptive phrase can be sent to the user's mobile device. Upon receiving the adaptive phrase, the user can transcribe the adaptive phrase in his or her own handwriting. This can be done on the input interface 104 of the user input device 102. Also, any other device, as described above, can be used for this process. The adaptive phrase can also be in the form of a verbal command or an image. The adaptive phrase can be in any suitable form which is accessible by a human. This can be advantageous to increase the security of the process and ensure that a human rather than a machine is being used to transcribe the adaptive phrase.

Upon the transcription of the adaptive phrase by user 101 via the user input device 102, the transcription, along with any additional metadata, can be sent via network 105 to the first entity 106. Metadata sent with the transcription can include, for example, the length of time it took to write the adaptive phrase, language or script of the adaptive phrase being transcribed, the pressure profile of the writing, the force profile of the writing, the relative speed of writing, the type of instrument used by the user to transcribe the phrase, and other hardware or software characteristics of the user input device 102, such as its maximum pressure sensitivity, pressure granularity, or any software information associated with the device. Additional information can also be sent with the adaptive phrase, such as a request by the user to access specific user information, such as a user's customer ID, loyalty points, or rewards card.

Upon receiving the transcription of the user, the first entity 106 can test the received transcribed adaptive phrase against computer models. As described below, these models can be generated using artificial intelligence based methods. The first entity 106 can compare the transcribed adaptive phrase to a user-specific computer-generated model of the adaptive phrase. By comparing the closeness of the received transcription against the computer-generated model, the first entity 106 can generate a score based on the closeness of the received transcription to the anticipated. Additionally, other metadata can be used by the first entity in generating the score, such as the pressure profile of the user transcription. The first entity 106 can also store a pre-determined score specific to the user identifier. This pre-determined score can be dynamically modified. Accordingly, if the comparison generates a score higher or equal to the pre-determined score, an authentication message is sent from the first entity to the user input device 102. The authentication message can also be sent to other entities, such as the credit card processor or credit card company, the user 101 through his or her personal device, or to the merchant who may be trying to verify the identity of the user 101. Additional information can also be sent with the authentication message, such as for example the reward points for a user's account. Information encrypted at the first entity associated with the user 101 can optionally be sent when an authentication message is unlocked.

If the comparison generates a score lower than the pre-determined score, the first entity 106 can send a failure message to the user input device 102. In this case, the first entity can send an updated adaptive phrase for the user 101 to transcribe. This phrase can be more complex or longer than the first adaptive phrase sent. A similar comparison to that described above can be performed by the first entity in an attempt to verify the identity of user 101. The first entity 106 can also change the pre-determined score threshold to ensure a closer match and a higher level of scrutiny. Additional scores specific to the metadata can also be generated and used in a comparison between the transcribed adaptive phrase received by the first entity 106 and the computer-generated model. For instance, a specific comparison can be done on metadata of interest, such as the pressure or pressure map associated with the handwriting sample.

Additional modifications can be made to the above example to ensure additional security. For instance, a shorter adaptive phrase can be sent by the first entity 106 when a small purchase is being attempted while larger than normal purchases can warrant that a longer adaptive phrase is sent by the first entity 106. Other rules can be programmed at the first entity 106 to modify the complexity and process of authentication of the identity of user 101. In addition, the predetermined threshold for the score can simply be a pass or fail based on whether the user's transcription of the adaptive phrase passes the trained discriminator, which is described further below.

As another example, a user 101 may decide to go shopping at an online store. The user 101 may not recall his or her user account or password associated with the online store. In such a case, the online store may allow an option for the user 101 to enter his or her user identifier. Upon entering the user identifier, along with optional metadata, the online store can send that information to the first entity 106. The first entity can accordingly identify which type of information is being requested by the online store of the user 101. Responsive to the user identifier being entered and transmitted to a first entity 106, the online store can display an adaptive phrase for the user 101 to enter. The user can transcribe this phrase in his or her own handwriting style using his or her mouse, touchscreen device, or through a digital tablet. Upon entering this transcription, the transcription can be sent to the first entity 106, where it is as described above, compared with either a computer-generated discriminator or a computer generated model of the adaptive phrase. The transcription sent to the first entity can also include metadata about the input device, which the first entity can optionally use in its process of authentication. If the first entity 106 determines that the user is authentic, the first entity can automatically send to the online store or the user 101 information associated with the online store or the metadata with which the request for authentication was sent. In this manner, a user 101 can advantageously enjoy a more efficient shopping experience without compromising security by using a train, namely, his or her handwriting style, as a method of authentication.

In another example, user 101 may decide to purchase, or otherwise conduct a transaction at a physical location, such as a store or bank. The process at a physical location can occur in a similar manner as described above. User 101 may for example carry with him or her a smartcard that is being used to conduct a transaction or otherwise transfer information at the physical location. This authentication can be triggered by certain criteria, such as for example, a certain purchase amount, a fraudulent alert sent from first entity 106, or preferences of user 101 which have been stored in the smartcard. However, the entity with whom user 101 is conducting the transaction may desire to authenticate the user to ensure that the smartcard that the user 101 is carrying properly belongs to or otherwise corresponds to user 101. Thus, the physical location may have for example, a terminal, which is capable of receiving commands and is in communication with first entity 106. Entity 106 can authenticate the identity of the individual represented on the smartcard by sending adaptive phrases to the physical location. Responsive to the user identifier being entered and transmitted to a first entity 106, the physical location can display an adaptive phrase for the user 101 to enter. The user can then transcribe the adaptive phrase on any suitable input device at the physical location, such as for example, a tablet, a point of sale device, a credit card reader, or any other suitable device. The transcription sent to the first entity can also include metadata about the input device, which the first entity can optionally use in its process of authentication. If the first entity 106 determines that the user is authentic, the first entity can automatically send to the online store or the user 101 information associated with the online store or the metadata with which the request for authentication was sent.

In another example, an individual may wish to enter into a contract or other legal agreement. In such a case, user 101 can be authenticated using first entity 106, without the need for additional forms of identification such as a driver license or passport. The user 101 can digitally or physically sign a document or contract, have the other party to the contract sign it, and use first entity 106 to authenticate the identities of both parties.

User identifiers can also be associated with more than one user. Such a scenario can be advantageously used where more than one user is associated with an account, such as, for example, a joint checking or savings account. In an exemplary embodiment, the first entity 106 can authenticate more than one user by performing the steps described above for each user, and only allow access to the joint account when both users are authenticated. This can be advantageously used when more than one user is required to perform a particular action, such as, for example, withdrawing money from the joint account. Such a scenario can also be advantageously used when two or more parties to a contract are required, and the signatures of the two parties is provided electronically. In this method, the identify of those signing the contract can be verified and the contract electronically entered into when the first entity 106 to verifies the identity of the intended parties to the contract.

Figure 2:
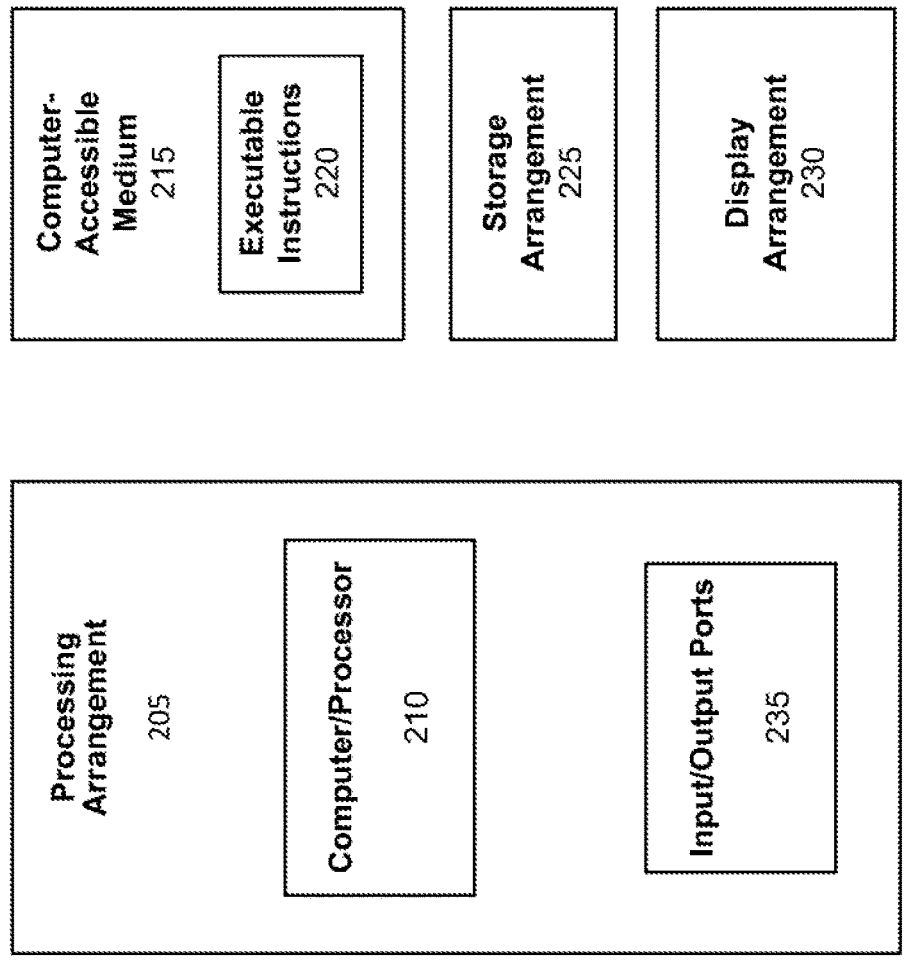
FIG. 2 is an illustration of a block diagram of a system according to example embodiments.

FIG. 2 shows a block diagram of an exemplary embodiment of a system 200 according to the present disclosure, which can be used to perform the procedures described below. For example, exemplary procedures in accordance with the present disclosure described herein can be performed by a processing arrangement and/or a computing arrangement (e.g., computer hardware arrangement) 205. Such processing/computing arrangement 205 can be, for example entirely or a part of, or include, but not limited to, a computer/processor 210 that can include, for example one or more microprocessors, and use instructions stored on a computer-accessible medium (e.g., RAM, ROM, hard drive, or other storage device).

As shown in FIG. 2, for example a computer-accessible medium 215 (e.g., a storage device such as a hard disk, floppy disk, memory stick, CD-ROM, RAM, ROM, etc., or a collection thereof) can be provided (e.g., in communication with the processing arrangement 205). The computer-accessible medium 215 can contain executable instructions 220 thereon. In addition, or alternatively, a storage arrangement 225 can be provided separately from the computer-accessible medium 215, which can provide the instructions to the processing arrangement 205 so as to configure the processing arrangement to execute certain exemplary procedures, processes, and methods, as described herein above, for example.

Further, the exemplary processing arrangement 305 can be provided with or include an input/output ports 235, which can include, for example a wired network, a wireless network, the internet, an intranet, a data collection probe, a sensor, etc. As shown in FIG. 2, the exemplary processing arrangement 205 can be in communication with an exemplary display arrangement 230, which, according to certain exemplary embodiments of the present disclosure, can be a touch-screen configured for inputting information to the processing arrangement in addition to outputting information from the processing arrangement, for example. Further, the exemplary display arrangement 230 and/or a storage arrangement 225 can be used to display and/or store data in a user-accessible format and/or user-readable format.

The first entity 106 can also store information related to the user 101 and the user identifier associated with user 101 to allow for the first entity to authenticate a user through a user's handwriting rather than a user's signature.

In an example embodiment, the first entity can use generative models based on samples presumed to be authentic handwriting of user 101 in order to train a generative adversarial network. Once the handwriting of user 101 has been sufficiently sampled, a neutral network in the form of a generative adversarial network can be trained to generate discriminators and generative models of the handwriting. Variations on the generative adversarial network can also be used, such as the use of multi-layer perceptrons, convolution neural networks or deconvolution neural networks.

The samples of handwriting from user 101 can be digital samples of writing or be digitized scans of writing performed by traditional writing tools such as pen or pencil on paper. The handwriting samples can consist of a pre-determined set of phrases which the user 101 can be asked to write. The handwriting samples can also consist of characters, or sets of characters, either alone, with spacing between the characters, or in a random or semi-random permutations.

A generative adversarial network can be trained by using a system of two neural networks, such as a network that generates potential candidates (a generator) and another network that evaluates the generated candidates (the discriminator). Known datasets, such as user provided input can provide the initial training data from the discriminator. After reaching a degree of accuracy, a generator is seeded with random input and generates data. The generated data by the generator attempts to pass as a sample from an authentic non-generated dataset when considered by the discriminator network. In other words, the generated data attempts to appear as a part of the true dataset. Following this, the samples generated by the generator network are evaluated by the discriminator. This process can be repeated so that the generator network can produce images closer to the true data set and the discriminator becomes more robust in evaluating and discriminating between generated images and true images. This process can be performed for each user 101 so that the network, discriminator, and generator are sufficiently trained for the user.

As part of the training, additional metadata can be evaluated by the generative adversarial network. One example of such metadata can be a pressure map associated with the user's handwriting. This pressure map can also be visualized as an image to be included as part of the generative adversarial network. Other metadata can consist of, for example, the speed of writing particular letters, words, or phrases. Once the network is sufficiently trained, the generated image or the discriminator can be used to evaluate a user's signature as described above.

For example, for authentication, the discriminator can be used to evaluate the authenticity of the user provided input. In another embodiment, the generator or generated images can be used to compare against what the user created, through for example a comparison with the generator of, the image, metadata, and/or pressure. Known statistical techniques can be used to compare the generated images, or the generator, with the user input.

If required, the generative adversarial network can be retrained, or provided with additional data, to account for variations in human handwriting changes over time. As an example, a person suffering from a medical condition may have small changes in his or her handwriting following the onset of the condition. In such a situation, the generative adversarial network can be either entirely retrained to account for the change in writing style of user 101, or additional samples can be provided to the generative adversarial network to further train the generator and the discriminator.

The generative adversarial network can also train various generators based on variations in handwriting style that occur due to differences in an input device used by user 101 when providing the samples to the generative adversarial network for training. For example, if a user uses his or her finger on a smartphone, or his or her mouse on a computer, the user's attempted transcription of a phrase will likely be different in various characteristics as compared to, for instance, the same user's use of a pen or a stylus on a display to transcribe the phrase. Accordingly, the generative adversarial network can account for these variations, which can be thought of as metadata. The first entity 106 can also advantageously use this metadata to expand the types of user input devices 102 with which the methods described herein can be operable with. The metadata can also be used to independently train and to generate additional scores, generative models, and discriminators. For example, the pressure or pressure map associated with a transcription can be advantageously used in this manner. Similarly, metadata associated with the input device can also be part of the algorithms and training embodiments described herein.

Additionally, the generative adversarial network is not limited in the languages or scripts with which it can be trained. For instance, although the use of Roman script is more common, transliteration of a phrase or word from in a particular language (e.g. English) into other scripts, such as Indic, Devanagari, Greek, Cyrillic, Chinese, Kanji, among others, is possible. It is also possible to provide phrases or words native to a particular script. For example, the same word can be used in different languages a user can indicate that he or she is fluent in. For instance, the word water, could be transliterated into " ", or translated into " ", when using a Devanagari script for a user that may be fluent in Hindi and English. It is further possible to synthesize new scripts for the sole purpose of training a generative adversarial network with a unique script which has been synthetically generated and training the generative adversarial network based on that script.

Other automated methods of artificial intelligence, supervised machine learning, and unsupervised machine learning can also be employed at the first entity 106. For example, any class of artificial intelligence algorithm that can be trained using a user's handwriting and generate a generative model of a user's handwriting based on the adaptive phrase can be used. In another example, statistical comparisons between metadata, images or between characters can be used.

One example of unsupervised learning could be using clustering. Through clustering, the characteristics of how a character is written and encoded can be collected. This information can be used to train a discriminator. The discriminator could use this information to determine authenticity of a sample provided by a user. Clustering could then be utilized to ensure that the encoded clusters for a given user fall within the same encoded clusters for the given characters that have been sent to the user. The parameters can be based on functions that utilize, for example, the metadata, pressure profile, or image of the handwriting as the arguments of the function.

As yet another example, individual characters could be trained using Independent Component Analysis (ICA). Independent component analysis (ICA) is a computational method through which a multivariate signal is separated into additive subcomponents. In ICA, the various components are considered to be statistically independent from each other and also considered to be non-Gaussian in their distribution. Variations of ICA can also be used in this example. The ICA method can be changed to contain 'n' sources of information, 'm' observations. The sources of information can be randomly generated, defined by a human using a computer or through the use of a machine learning algorithm.

As yet another example, the generative adversarial network could use a technique called a variational autoencoder (VAE). The VAE could break down writing into codes, which can then be used for comparison, either using the discriminator to evaluate authenticity or using the generator or generated images.

Figure 3:
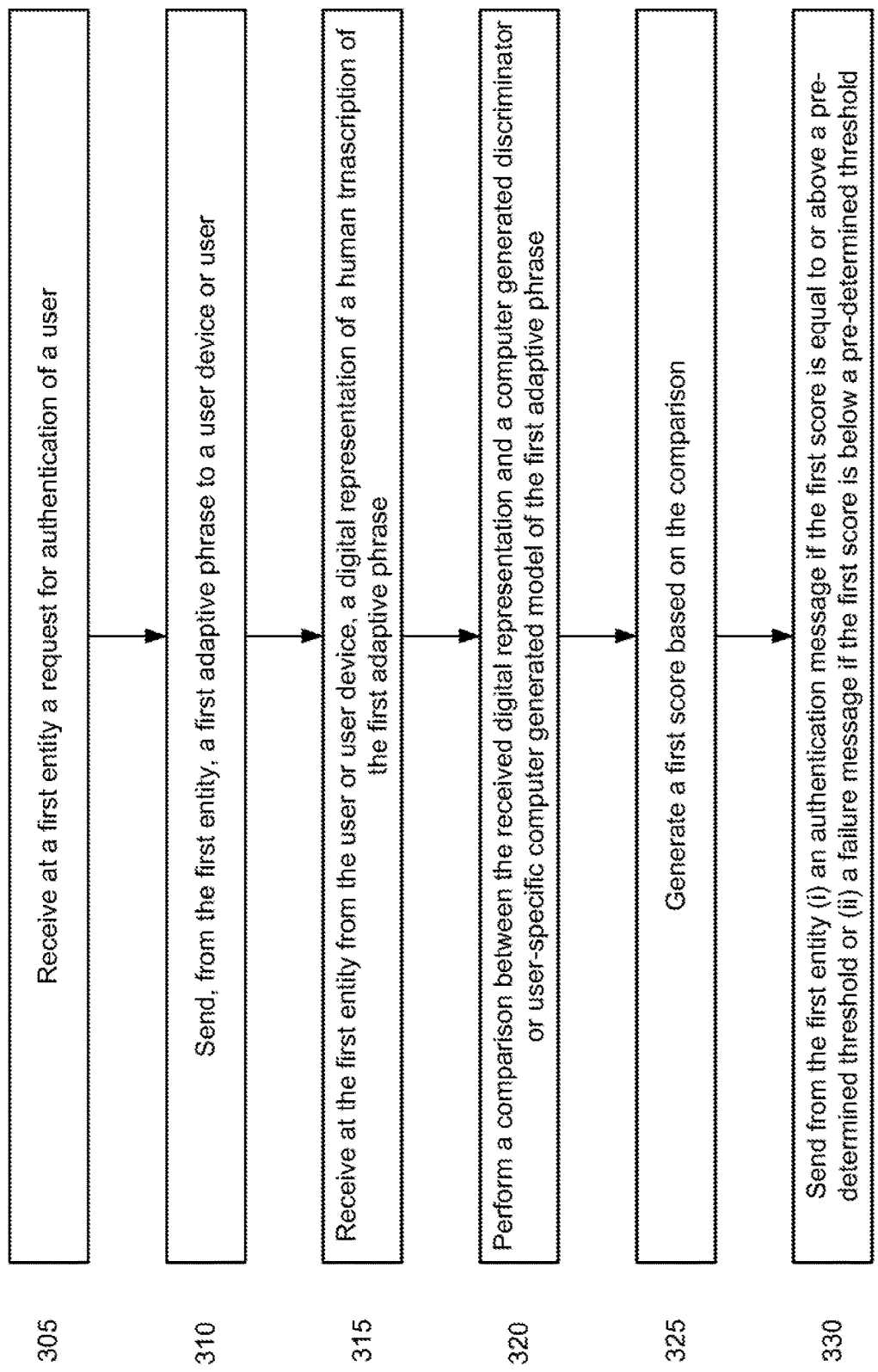
FIGS. 3 to 7 are flow diagrams of methods for processes of authentication based on a request for authentication of a user associated with a user identifier according to example embodiments.

FIG. 3 shows an example flow diagram of a method 300 according to an example embodiment of the present disclosure. In step 305, a first entity 106 can receive a request for authentication of a user 101 from a user 101 or a user input device 102. The information can contain additional details, such as the nature of the input device or the purpose of authentication. The information can contain additional details, such as for example, the purpose of the authentication, a request for additional information from the first entity, or the time or location from which the request originated. This can be done over any communication medium or through the use of network 105. At step 310, the first entity 106 can send a first adaptive phrase to a user input device 102 or a user 101. The adaptive phrase can be as complex or simple as desired and can also be created based on rules associated with a user device. At step 315, the first entity 107 can receive from the user 101 or a user input device 102, a digital representation of a human transcription of the first adaptive phrase. This step can contain additional metadata, such as the profile of the input device, the speed of the handwriting, the pressure profile of the writing, whether the writer is left or right handed, etc. This transmission can occur in any suitable medium to the first entity from the user input device, such as through network 106. In step 320, the first entity 107 can perform a comparison between the received digital representation and a computer-generated discriminator or user-specific computer-generated model of the first adaptive phrase. In step 325, the first entity can generate a score based on the comparison. This comparison can be made, for example, by assigning a score based on how close to the computer-generated model the transcription of the adaptive phrase is. The score can be a binary score of pass or fail based on whether the received transcription passes the computer-generated discriminator. In step 330, an authentication message can be sent from the first entity if the score is equal to or above a pre-determined threshold or a failure message can be sent if the score is below a pre-determined threshold. Additional metadata can be associated with the authentication message, such as any additional information associated with the user identifier.

Figure 4:
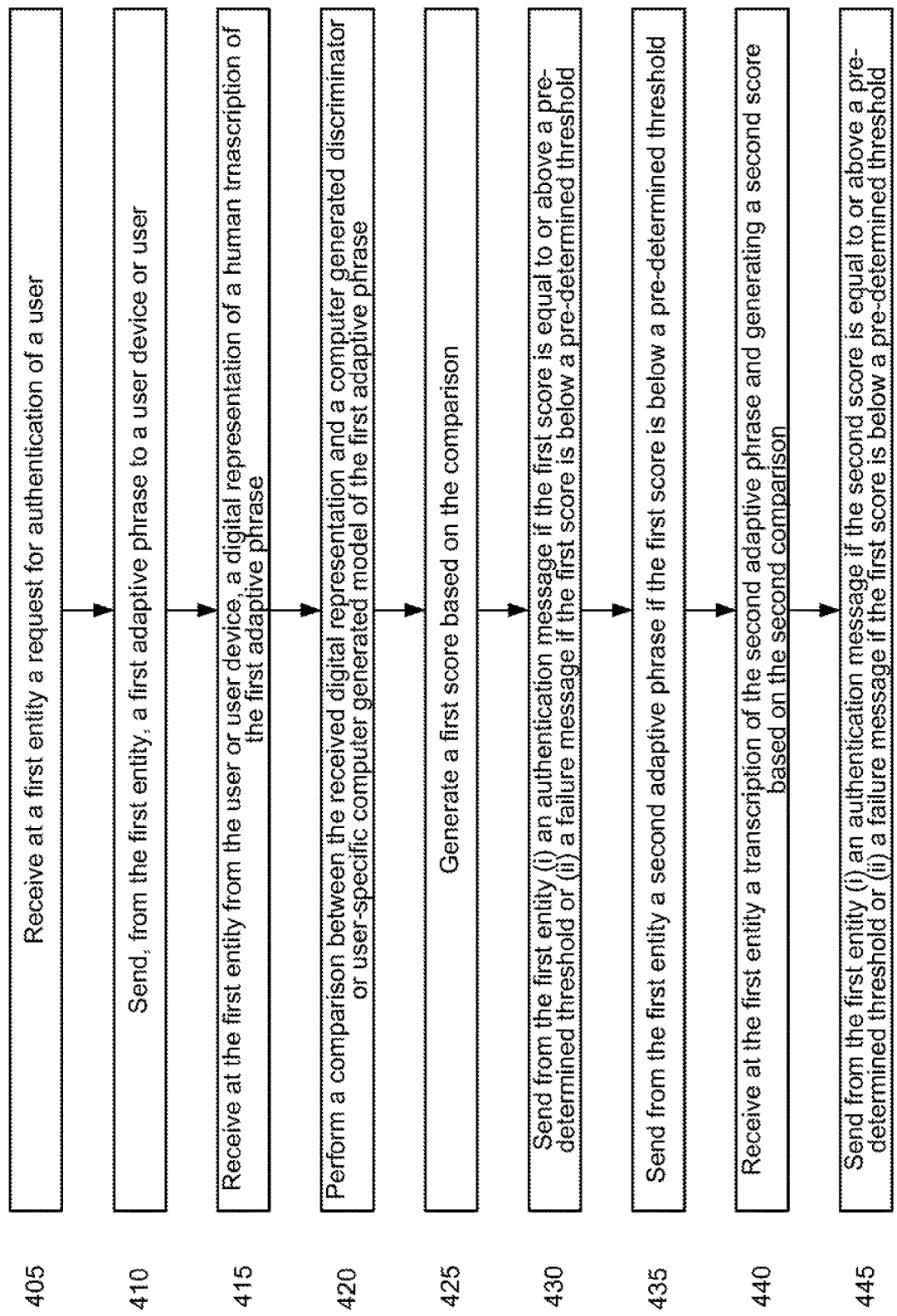

FIG. 4 shows an exemplary flow diagram of a method 400 according to an example embodiment of the present disclosure. In step 405, a first entity 106 can receive a request for authentication of a user 101 from a user 101 or a user input device 102. The information can contain additional details, such as for example, the purpose of the authentication, a request for additional information from the first entity, or the time or location from which the request originated. This can be done over any communication medium or through the use of network 105. At step 410, the first entity 106 can send a first adaptive phrase to a user input device 102 or a user 101. The adaptive phrase can be as complex or simple as desired and can also be created based on rules associated with a user device. At step 415, the first entity 107 can receive from the user 101 or a user input device 102, a digital representation of a human transcription of the first adaptive phrase. This step can contain additional metadata, such as the profile of the input device, the speed of the handwriting, the pressure profile of the writing, whether the writer is left or right handed, etc. This step can contain additional metadata, such as the profile of the input device, the speed of the handwriting, the pressure profile of the writing, whether the writer is left or right handed, etc. This transmission can occur in any suitable medium to the first entity from the user input device, such as through network 106. In step 420, the first entity 107 can perform a comparison between the received digital representation and a computer-generated discriminator or user-specific computer-generated model of the first adaptive phrase. The details of this comparison are explained above and any suitable method can be employed for this comparison. In step 425, the first entity can generate a score based on the comparison. In step 430, the first entity can send (i) an authentication message if the first score is equal to or above a pre-determined threshold or (ii) a failure message if the first score is below a pre-determined threshold. Additional metadata can be associated with the authentication message, such as any additional information associated with the user identifier. In step 435, the first entity can send a second adaptive phrase if the first score is below a pre-determined threshold. This threshold can be based on a variety of factors, including for example, the user identifier associated with a user 101. In step 440, the first entity 107 can receive a transcription of the second adaptive phrase and generate a second score based on the second comparison. This second comparison can utilize the same or different method of comparison as the first comparison. In step 445, the first entity can send (i) an authentication message if the second score is equal to or above a pre-determined threshold or (ii) a failure message if the first score is below a pre-determined threshold. The authentication message or failure message can contain additional metadata or append additional data associated with the user identifier.

Figure 5:
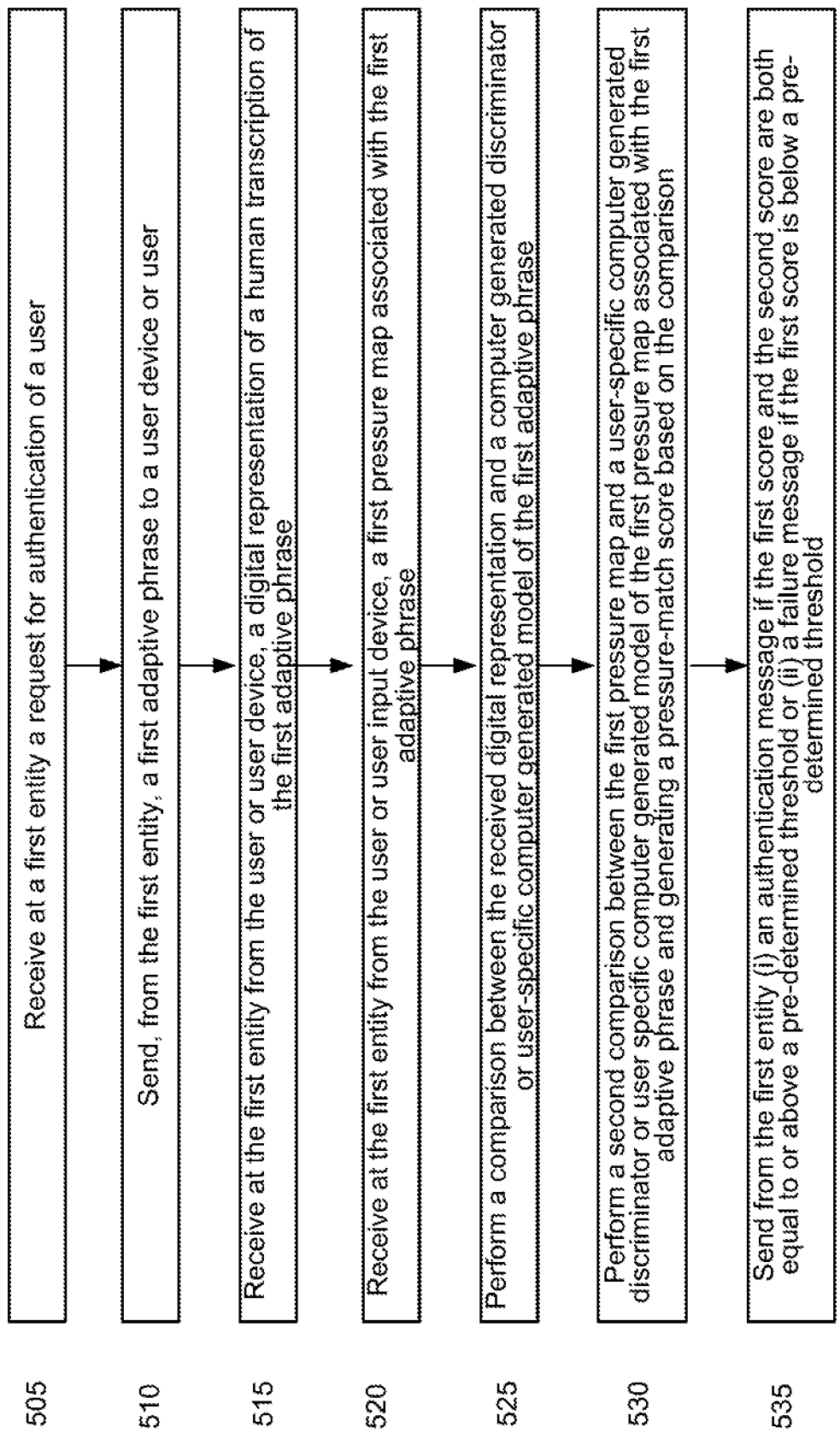

FIG. 5 shows an example flow diagram of a method 500 according to an example embodiment of the present disclosure. In step 505, a first entity 106 can receive a request for authentication of a user 101 from a user 101 or a user input device 102. The information can contain additional details, such as for example, the purpose of the authentication, a request for additional information from the first entity, or the time or location from which the request originated. This can be done over any communication medium or through the use of network 105. At step 510, the first entity 106 can send a first adaptive phrase to a user input device 102 or a user 101. At step 515, the first entity 107 can receive from the user 101 or a user input device 102, a digital representation of a human transcription of the first adaptive phrase. This transmission can occur in any suitable medium to the first entity from the user input device, such as through network 106. This step can contain additional metadata, such as the profile of the input device, the speed of the handwriting, the pressure profile of the writing, whether the writer is left or right handed, etc. In step 520, the first entity 107 can receive from the user 101 or a user device 102, a first pressure map associated with the first adaptive phrase. This transmission can occur in any suitable medium to the first entity from the user input device, such as through network 106. In step 525, a first entity can perform a comparison between the received digital representation and a computer-generated discriminator or user-specific computer-generated model of the first adaptive phrase. In this step, a discriminator can be used in an attempt to determine if the received representation is accurate. The discriminator can have been previously trained to spot fake handwriting samples. In step 530, the first entity can perform a second comparison between the first pressure map and a user-specific computer-generated discriminator or user-specific computer-generated model of the first pressure map associated with the first adaptive phrase and generating a pressure-match score based on the comparison. In step 535, the first entity can send (i) an authentication message if the first score and the second score are both equal to or above a pre-determined threshold or (ii) a failure message if the first score is below a pre-determined threshold. The authentication message or failure message can contain additional metadata or append additional data associated with the user identifier. The messages can be sent through any suitable medium to the user or the user input device, through for example, network 105.

Figure 6:
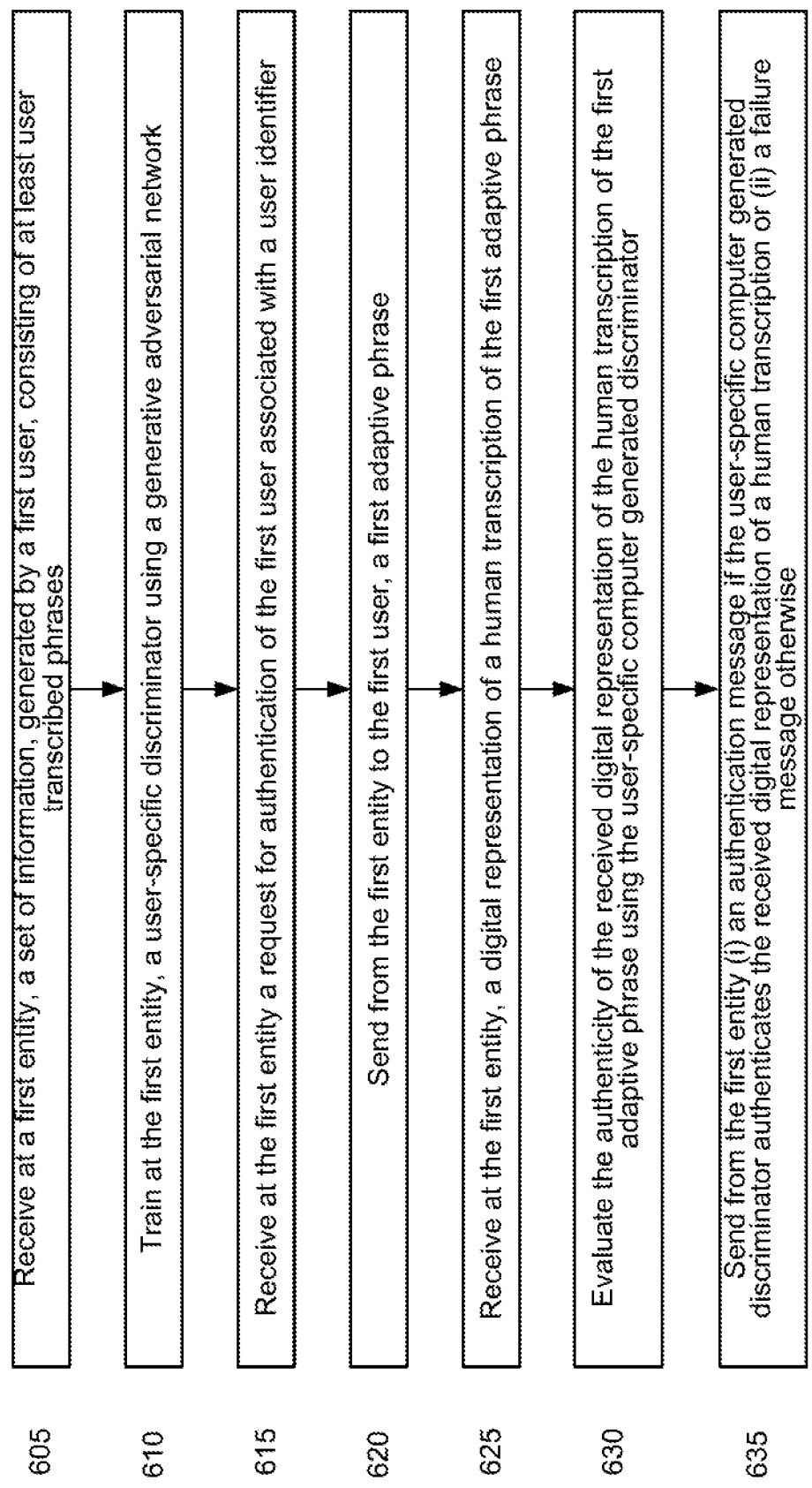

FIG. 6 shows an example flow diagram of a method 600 according to an example embodiment of the present disclosure. In step 605, a first entity can receive a set of information, generated by a first user, consisting of at least user transcribed phrases. In step 610, the first entity can train a user-specific discriminator using a generative adversarial network. This training can occur through the use of artificial intelligence and machine learning methods. An example method to train the generative adversarial network is through the training of use of generators and discriminators using the set of information generated by the first user consisting of at least user transcribed phrases. In step 615, the first entity can receive a request for authentication of the first user associated with a user identifier. The information can contain additional details, such as for example, the purpose of the authentication, a request for additional information from the first entity, or the time or location from which the request originated. This can be done over any communication medium or through the use of network 105. In step 620, the first entity can send to the first user a first adaptive phrase. This phrase can be transcribed by the user using any suitable method. In step 625, at the first entity, a digital representation of the human transcription of the first adaptive phrase is received. In step 630, the first entity can evaluate the authenticity of the received digital representation of the human transcription of the first adaptive phrase using the user-specific computer-generated discriminator. In this step, a discriminator can be used in an attempt to determine if the received representation is accurate. The discriminator can have been previously trained to spot fake handwriting samples. In step 635, the first entity can send (i) an authentication message if the user-specific computer-generated discriminator authenticates the received digital representation of a human transcription or (ii) a failure message otherwise. The authentication message or failure message can contain additional metadata or append additional data associated with the user identifier. The messages can be sent through any suitable medium to the user or the user input device, through for example, network 105.

Figure 7:
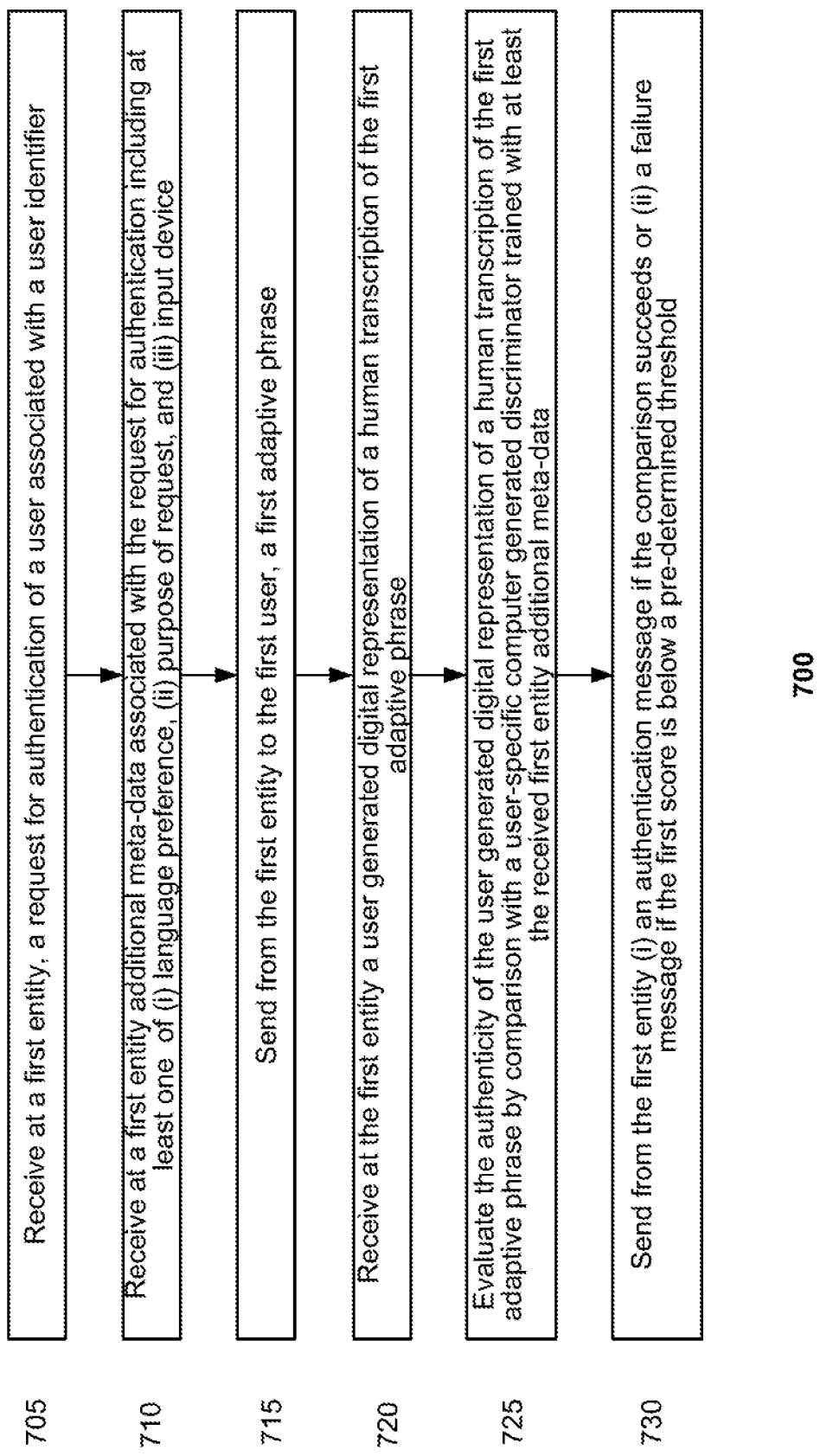

FIG. 7 shows an example flow diagram of a method 700 according to an example embodiment of the present disclosure. In step 705, the first entity can receive a request for authentication of a user associated with a user identifier. In step 710, the first entity can receive additional metadata associated with the request for authentication including at least one of (i) language preference, (ii) purpose of request, and (iii) input device. In step 715, the first entity can send to a user 101 a first adaptive phrase. In step 720, the first entity can receive a user generated digital representation of a human transcription of the first adaptive phrase. In step 725, the first entity can evaluate the authenticity of the user generated digital representation of a human transcription of the first adaptive phrase by comparison with a user-specific computer-generated discriminator trained with at least the received first entity additional metadata. In this step, a discriminator can be used in an attempt to determine if the received representation is accurate. The discriminator can have been previously trained to spot fake handwriting samples. In step 730, the first entity can send (i) an authentication message if the comparison succeeds or (ii) a failure message if the first score is below a pre-determined threshold. The authentication message or failure message can contain additional metadata or append additional data associated with the user identifier. The messages can be sent through any suitable medium to the user or the user input device, through for example, network 105. The pre-determined threshold in this step can be based on any criteria chosen, including for example, the user identifier.

The present disclosure is not to be limited in terms of the particular embodiments described in this application, which are intended as illustrations of various aspects. Many modifications and variations can be made without departing from its spirit and scope, as can be apparent. Functionally equivalent methods and apparatuses within the scope of the disclosure, in addition to those enumerated herein, can be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method, comprising:
   receiving at a first entity, a request for authentication of a user associated with a user identifier;
   sending from the first entity to the user, a first adaptive phrase;
   receiving at the first entity, a digital representation of a human transcription of the first adaptive phrase;
   performing an artificial-intelligence based comparison between the received digital representation of the human transcription of the first adaptive phrase and a user-specific computer-generated discriminator, wherein the discriminator is trained by a generative adversarial network;
   generating a first score based on the comparison; and
   sending from the first entity (i) an authentication message if the first score is equal to or above a pre-determined threshold or (ii) a failure message if the first score is below a pre-determined threshold.

2. The method of claim 1, further comprising sending a second adaptive phrase if the first score is below a pre-determined threshold, receiving at the first entity a digital representation of a human transcription of the second adaptive phrase, performing a second comparison between the received digital representation of the human transcription of the second adaptive phrase to a user-specific computer generated discriminator or user-specific computer-generated model of the second adaptive phrase, generating a second score based on the second comparison, and sending from the first entity (i) an authentication message if the second score is equal to or above a pre-determined threshold or (ii) a failure message if the second score is below a pre-determined threshold.

3. The method of claim 1, wherein the number of characters in the adaptive phrase is based on the user identifier associated with the user.

4. The method of claim 1, wherein the pre-determined threshold is based on the user identifier.

5. The method of claim 1, wherein the pre-determined threshold is modified based on a prior failure message.

6. The method of claim 1, wherein additional metadata is associated with the request for authentication.

7. The method of claim 6, wherein the metadata associated with the request consists of at least one of (i) input device, (ii) purpose of authentication, (iii) a request for additional information associated with the user stored at the first entity, or (iv) language or script preference.

8. The method of claim 1, further comprising receiving at the first entity a first pressure map associated with the first adaptive phrase.

9. The method of claim 8, further comprising performing a second comparison between the first pressure map and a user-specific computer-generated discriminator or user-specific computer-generated model of the first pressure map associated with the first adaptive phrase and generating a pressure-match score based on the comparison.

10. The method of claim 9, further comprising modifying the first score by the second score.

11. The method of claim 10, further comprising sending from the first entity (i) an authentication message if the first score and the second score are both equal to or above a pre-determined threshold or (ii) a failure message if the first score is below a pre-determined threshold.

12. The method of claim 11, wherein the request for an authentication of a user associated with a user identifier further includes metadata associated with the input device for the digital representation of a human transcription of the first adaptive phrase; and wherein the comparison between the first pressure map and a user-specific computer generated discriminator or user-specific computer generated model of the first pressure map associated with the first adaptive phrase is modified based on the metadata associated with the input device.

13. The method of claim 1, wherein additional information associated with the user stored at the first entity is attached to the authentication message.

14. The method of claim 1, wherein the comparison between the digital representation of a human transcription of the first adaptive phrase and a user-specific computer-generated discriminator is performed with a discriminator further trained using a convolution neural network.

15. A system, comprising:
   a computer hardware arrangement configured to:
      receive at a first entity, a set of information, generated by a first user, consisting of at least user transcribed phrases;
      train at the first entity, a user-specific discriminator using a generative adversarial network;
      receive at the first entity a request for authentication of the first user associated with a user identifier;
      send from the first entity to the first user, a first adaptive phrase;
      receive at the first entity, a digital representation of a human transcription of the first adaptive phrase;
      evaluate the authenticity of the received digital representation of the human transcription of the first adaptive phrase using the user-specific computer-generated discriminator; and
      send from the first entity (i) an authentication message if the user-specific computer-generated discriminator authenticates the received digital representation of a human transcription or (ii) a failure message otherwise.

16. The system of claim 15, wherein the set of information further contains at least pressure values associated with the user transcribed phrases.

17. The system of claim 16, wherein the set of information further contains at least metadata about an input device used for the user transcribed phrases.

18. The system of claim 17, wherein a second discriminator is trained based on the metadata about the input device.

19. The system of claim 15, wherein the computer hardware arrangement is further configured to attempt to match the received digital representation of the human transcription of the first adaptive phrase to a second user through comparison with a data-base of user-specific computer-generated discriminators or user-specific computer-generated models.

20. A non-transitory computer-accessible medium having stored thereon computer-executable instructions for providing encrypted user information, wherein, when a computer arrangement executes the instructions, the computer arrangement is configured to perform procedures comprising:
   receiving at the computer-accessible medium, a request for authentication of a user associated with a user identifier;
   receiving at the computer-accessible medium metadata associated with the request for authentication including at least one of (i) language preference, (ii) purpose of request, or (iii) input device;
   sending from the computer-accessible medium to the user a first adaptive phrase;

receiving at the computer-accessible medium a user generated digital representation of a human transcription of the first adaptive phrase;

evaluating the authenticity of the user generated digital representation of a human transcription of the first adaptive phrase by comparison with a user-specific computer-generated discriminator trained by a generative adversarial network with at least the received first entity additional metadata;

sending from the computer-accessible medium (i) an authentication message if the comparison succeeds or (ii) a failure message; and when a failure message is sent from the computer-accessible medium, iterating the instructions.

* * * * *